United States Patent
Gao et al.

(10) Patent No.: US 10,701,208 B2
(45) Date of Patent: Jun. 30, 2020

(54) MULTI-PARTY CALL CONTROL METHOD AND DEVICE, AND MULTI-PASS TERMINAL

(71) Applicant: SPREADTRUM COMMUNICATIONS (SHANGHAI) CO., LTD., Zhangjiang, Shanghai (CN)

(72) Inventors: Xichun Gao, Shanghai (CN); Mengping Xu, Shanghai (CN); Huawei Zhang, Shanghai (CN); Ping Jiang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 31 days.

(21) Appl. No.: 15/805,550

(22) Filed: Nov. 7, 2017

(65) Prior Publication Data
US 2018/0183935 A1 Jun. 28, 2018

(30) Foreign Application Priority Data
Dec. 22, 2016 (CN) .......................... 2016 1 1198162

(51) Int. Cl.
*H04M 3/56* (2006.01)
*H04L 29/06* (2006.01)

(52) U.S. Cl.
CPC ............ *H04M 3/56* (2013.01); *H04L 65/403* (2013.01); *H04M 2203/5018* (2013.01); *H04M 2207/185* (2013.01)

(58) Field of Classification Search
CPC ............. H04M 3/56; H04M 2207/185; H04M 2203/5018; H04L 65/403; H04W 4/06
See application file for complete search history.

(56) References Cited

U.S. PATENT DOCUMENTS

| | | | | |
|---|---|---|---|---|
| 2006/0215765 A1* | 9/2006 | Hwang | .................. | H04N 7/152 375/240.21 |
| 2007/0061398 A1* | 3/2007 | Forssell | .............. | H04L 12/1827 709/204 |
| 2007/0200923 A1* | 8/2007 | Eleftheriadis | .......... | H04N 7/152 348/14.08 |
| 2008/0068446 A1* | 3/2008 | Barkley | ................. | H04N 7/147 348/14.07 |
| 2008/0276068 A1* | 11/2008 | Ashraf | ................ | H04L 65/1016 712/20 |
| 2012/0226997 A1* | 9/2012 | Pang | .................. | H04L 65/4038 715/753 |
| 2013/0215213 A1* | 8/2013 | Power | ................. | H04L 65/4076 348/14.02 |

(Continued)

*Primary Examiner* — Shailendra Kumar
(74) *Attorney, Agent, or Firm* — Cantor Colburn LLP

(57) ABSTRACT

Multi-party call control method and device, and a multi-pass terminal are provided. The method includes: setting up calls with at least two terminals, respectively; and controlling uplink and downlink service data of at least one of the at least two terminals, or informing a network to control uplink and downlink service data of at least one of the at least two terminals, or informing at least one of the at least two terminals to control uplink and downlink service data of the at least one terminal. Compared with the existing techniques, in embodiments of the present disclosure, all the remote terminals in the multi-party call may be flexibly controlled according to different session demands and actions.

11 Claims, 10 Drawing Sheets

(56) References Cited

U.S. PATENT DOCUMENTS

| | | | |
|---|---|---|---|
| 2013/0252595 A1* | 9/2013 | Mairs | H04L 67/14 455/415 |
| 2015/0097922 A1* | 4/2015 | Le Devehat | H04L 65/1069 348/14.08 |
| 2015/0207847 A1* | 7/2015 | Kim | H04L 67/04 709/204 |
| 2015/0358584 A1* | 12/2015 | Mattson | H04N 7/15 348/14.08 |
| 2016/0134760 A1* | 5/2016 | Castro Castro | H04L 12/1407 455/406 |
| 2017/0085597 A1* | 3/2017 | Rathore | H04L 65/1069 |
| 2017/0237788 A1* | 8/2017 | Xi | H04L 65/4015 709/204 |
| 2017/0280098 A1* | 9/2017 | Sethuraman | H04N 7/15 |

* cited by examiner

US 10,701,208 B2

MULTI-PARTY CALL CONTROL METHOD AND DEVICE, AND MULTI-PASS TERMINAL

CROSS-REFERENCE TO RELATED APPLICATIONS

The present invention claims priority under 35 U.S.C. § 119 to Chinese patent application No. 201611198162.6, filed on Dec. 22, 2016, the entire content of which is incorporated herein by reference.

TECHNICAL FIELD

The present disclosure generally relates to communication technology field, and more particularly, to multi-party call control method and device, and a multi-pass terminal.

BACKGROUND

With the continuous improvement of bandwidth of mobile networks and the optimization of performance of mobile devices, demands of users on services provided by mobile terminals become stricter gradually. At present, service of mobile terminals has become more and more diversified from traditional two-party calls to video calls, call transfer, multi-party calls and so on. A multi-party call is realized by a multi-pass terminal setting up a first call, keeping the first call, setting up a second call, and merging the first and second calls.

Inventors found that there are at least the following technical problems in the existing techniques. In the multi-party call, the multi-pass terminal cannot flexibly control all the remote terminals in the multi-party call according to different session demands and actions.

SUMMARY

In embodiments of the present disclosure, multi-party call control method and device, and a multi-pass terminal are provided. All the remote terminals in the multi-party call may be flexibly controlled according to different session demands and actions.

In an embodiment of the present disclosure, a multi-party call control method is provided, including: setting up calls with at least two terminals, respectively; and controlling uplink and downlink service data of at least one of the at least two terminals, or informing a network to control uplink and downlink service data of at least one of the at least two terminals, or informing at least one of the at least two terminals to control uplink and downlink service data of the at least one terminal.

Optionally, controlling uplink and downlink service data of at least one of the at least two terminals may include: discarding service data from at least one of the at least two terminals; or cutting off service data transmitted to at least one of the at least two terminals; or discarding service data from at least one of the at least two terminals and cutting off service data transmitted to at least one of the at least two terminals.

Optionally, informing a network to control uplink and downlink service data of at least one of the at least two terminals may include: informing the network to discard service data from at least one of the at least two terminals; or informing the network to cut off service data transmitted to at least one of the at least two terminals; or informing the network to discard service data from at least one of the at least two terminals and cut off service data transmitted to at least one of the at least two terminals.

Optionally, informing at least one of the at least two terminals to control uplink and downlink service data of the at least one terminal may include: informing at least one of the at least two terminals to prohibit transmitting service data of the at least one terminal; or informing at least one of the at least two terminals to prohibit receiving service data; or informing at least one of the at least two terminals to prohibit transmitting service data of the at least one terminal and receiving service data.

Optionally, setting up calls with at least two terminals, respectively may include: during the set-up of a new call among the calls, a call among the calls which has been set up is in an activated state.

Optionally, the calls may be based on a radio network connection.

Optionally, the calls may be VoLTE service or VoWiFi service.

In an embodiment of the present disclosure, a multi-party call control device is provided, including: a first call setting up circuitry configured to set up calls with at least two terminals, respectively; and a controlling circuitry configured to control uplink and downlink service data of at least one of the at least two terminals, or inform a network to control uplink and downlink service data of at least one of the at least two terminals, or inform at least one of the at least two terminals to control uplink and downlink service data of the at least one terminal.

Optionally, the controlling circuitry may be configured to: discard service data from at least one of the at least two terminals; or cut off service data transmitted to at least one of the at least two terminals; or discard service data from at least one of the at least two terminals and cut off service data transmitted to at least one of the at least two terminals.

Optionally, the controlling circuitry may be configured to: inform the network to discard service data from at least one of the at least two terminals; or inform the network to cut off service data transmitted to at least one of the at least two terminals; or inform the network to discard service data from at least one of the at least two terminals and cut off service data transmitted to at least one of the at least two terminals.

Optionally, the controlling circuitry may be configured to: inform at least one of the at least two terminals to prohibit transmitting service data of the at least one terminal; or inform at least one of the at least two terminals to prohibit receiving service data; or inform at least one of the at least two terminals to prohibit transmitting service data of the at least one terminal and receiving service data.

Optionally, the first call setting up circuitry may be configured to: during the set-up of a new call among the calls, control a call among the calls which has been set up to be in an activated state, and control the at least two terminals not to perform service data interaction.

Optionally, the calls may be based on a radio network connection.

Optionally, the calls are VoLTE service or VoWiFi service.

In an embodiment of the present disclosure, a multi-pass terminal including the above multi-party call control device is provided.

Embodiments of the present disclosure provide multi-party call control method and device, and a multi-pass terminal. The method includes: setting up calls with at least two terminals, respectively; and controlling uplink and downlink service data of at least one of the at least two terminals, or informing a network to control uplink and downlink service data of at least one of the at least two terminals, or informing at least one of the at least two terminals to control uplink and downlink service data of the at least one terminal. Compared with the existing techniques, in embodiments of the present disclosure, all the remote terminals in the multi-party call may be flexibly controlled according to different session demands and actions.

DETAILED DESCRIPTION

In order to clarify the object, solutions and advantages of embodiments of the present disclosure, embodiments of present disclosure will be described clearly in detail in conjunction with accompanying drawings. Below embodiments are only a portion of embodiments of the present disclosure. Other embodiments obtained by those skilled in the art without creative efforts based on the below embodiments belong to scope of the present disclosure.

Figure 1:
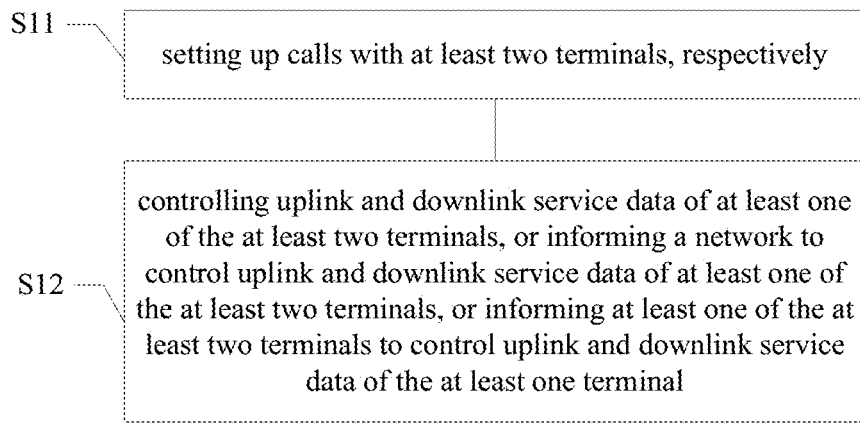
FIG. 1 schematically illustrates a flow chart of a multi-party call control method according to an embodiment.

FIG. 1 schematically illustrates a flow chart of a multi-party call control method according to an embodiment. Referring to FIG. 1, the method may include:

S11, setting up calls with at least two terminals, respectively; and

S12, controlling uplink and downlink service data of at least one of the at least two terminals, or informing a network to control uplink and downlink service data of at least one of the at least two terminals, or informing at least one of the at least two terminals to control uplink and downlink service data of the at least one terminal.

In some embodiments, controlling uplink and downlink service data of at least one of the at least two terminals may include: discarding service data from at least one of the at least two terminals; or cutting off service data transmitted to at least one of the at least two terminals; or discarding service data from at least one of the at least two terminals and cutting off service data transmitted to at least one of the at least two terminals.

Figure 2:
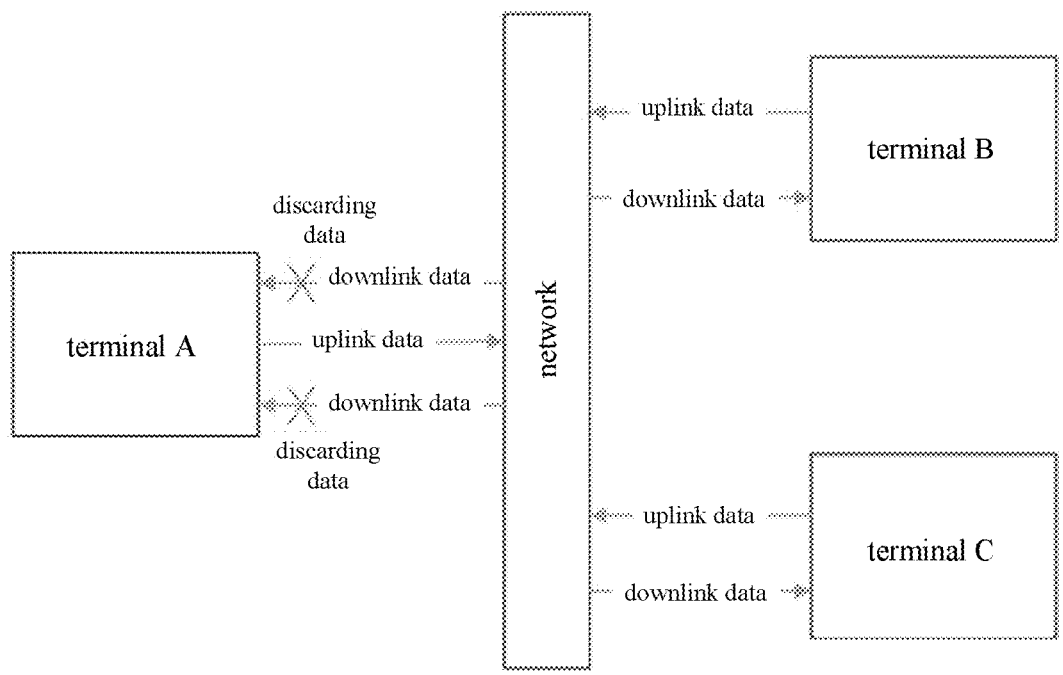
FIG. 2 schematically illustrates a diagram of a multi-party call control method according to an embodiment.

The multi-party call control method is described in detail below with a specific embodiment. Referring to FIG. 2, a terminal A is a host party, and terminals B and C are participant parties. The multi-party call control method may include: the terminal A setting up calls with the terminals B and C, respectively; and the terminal A discarding downlink service data of the terminals B and C.

In the method shown in FIG. 2, the terminal A as the host party realizes unidirectionally speaking to the terminals B and C as the participant parties.

Figure 3:
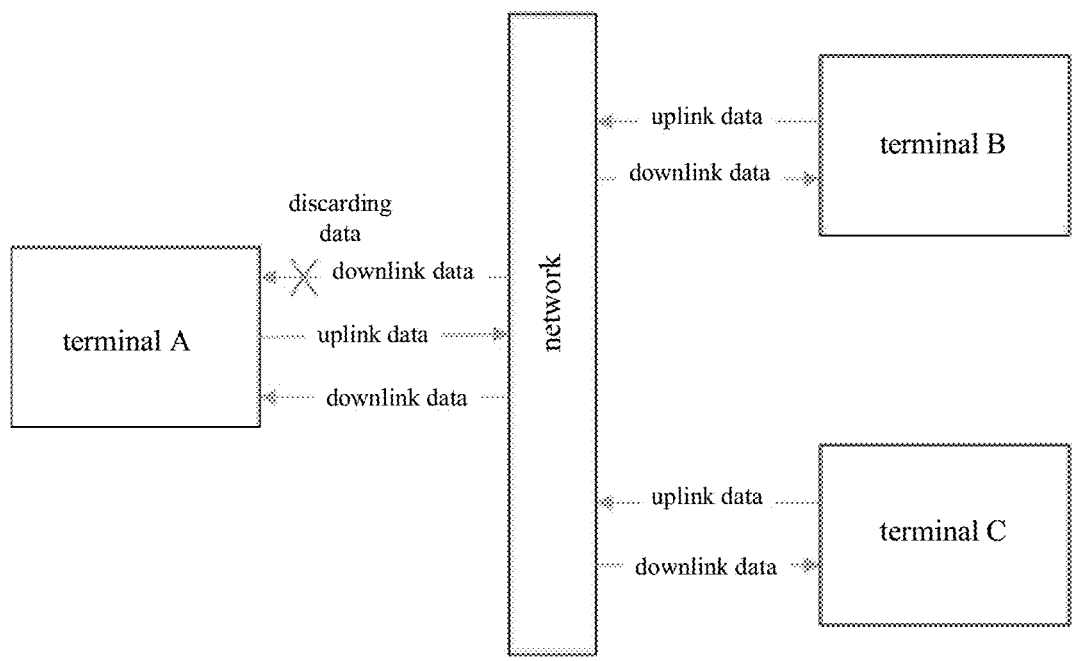
FIG. 3 schematically illustrates a diagram of a multi-party call control method according to an embodiment.

The multi-party call control method is described in detail below with another specific embodiment. Referring to FIG. 3, a terminal A is a host party, and terminals B and C are participant parties. The multi-party call control method may include: the terminal A setting up calls with the terminals B and C, respectively; and the terminal A discarding downlink service data of the terminal B.

In the method shown in FIG. 3, the terminal A as the host party realizes prohibiting speaking of the terminal B in the participant parties.

Figure 4:
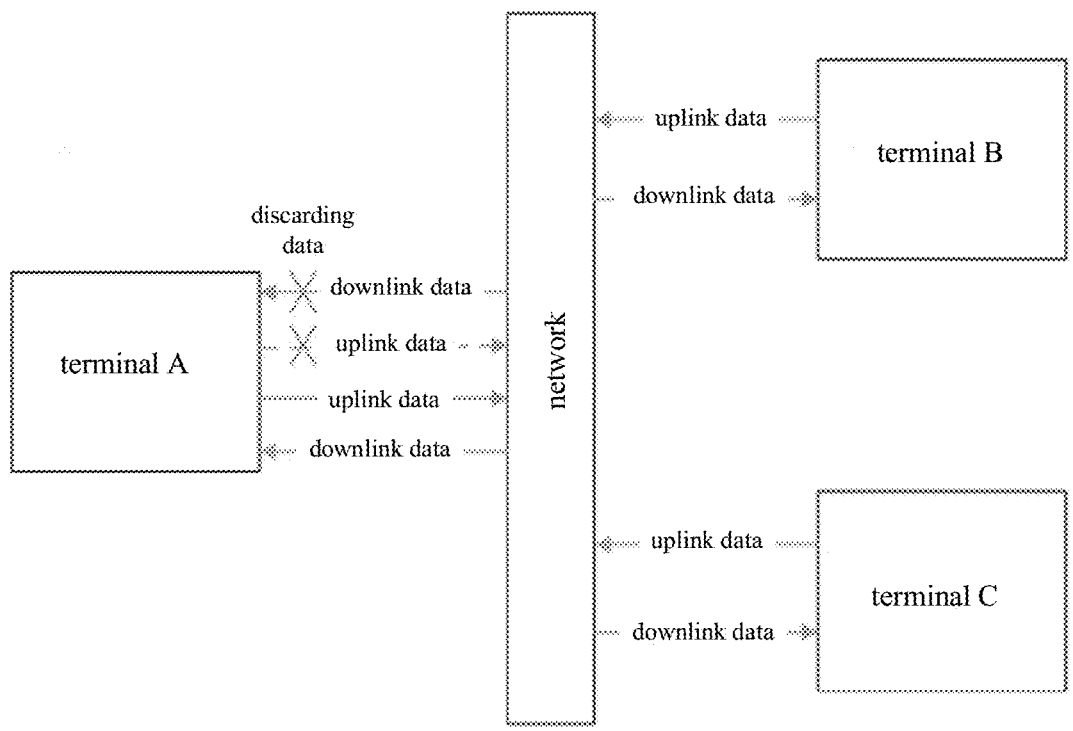
FIG. 4 schematically illustrates a diagram of a multi-party call control method according to an embodiment.

The multi-party call control method is described in detail below with another specific embodiment. Referring to FIG. 4, a terminal A is a host party, and terminals B and C are participant parties. The multi-party call control method may include: the terminal A setting up calls with the terminals B and C, respectively; and the terminal A discarding downlink service data of the terminal B and cutting off uplink service data of the terminal B.

In the method shown in FIG. 4, the terminal A as the host party realizes isolating the terminal B in the participant parties.

In some embodiments, informing a network to control uplink and downlink service data of at least one of the at least two terminals may include: informing the network to discard service data from at least one of the at least two terminals; or informing the network to cut off service data transmitted to at least one of the at least two terminals; or informing the network to discard service data from at least one of the at least two terminals and cut off service data transmitted to at least one of the at least two terminals.

Figure 5:
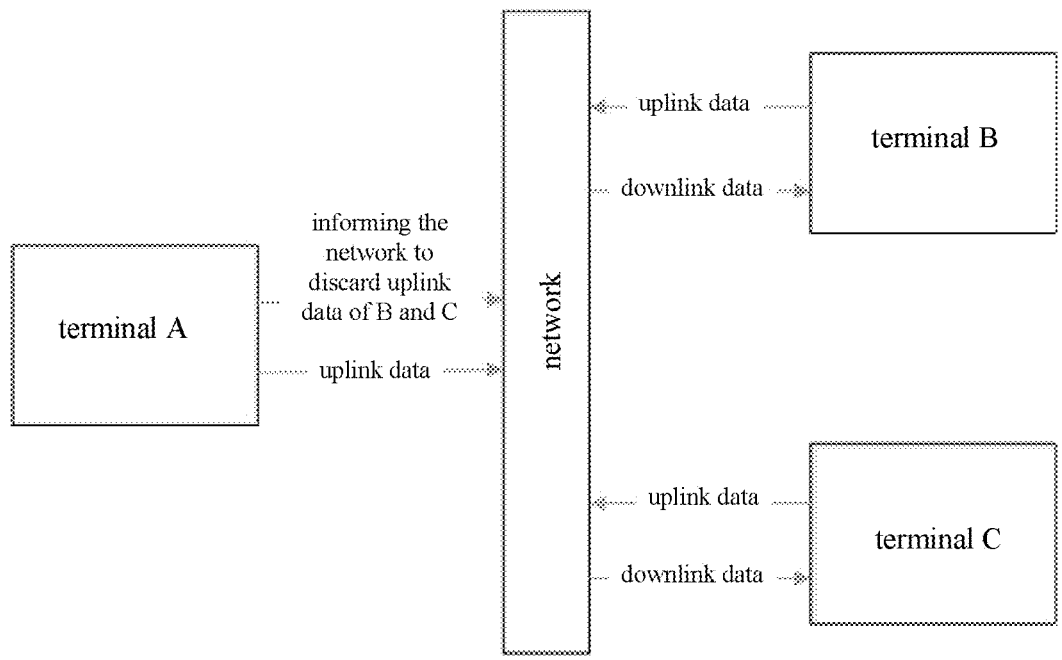
FIG. 5 schematically illustrates a diagram of a multi-party call control method according to an embodiment.

The multi-party call control method is described in detail below with a specific embodiment. Referring to FIG. 5, a terminal A is a host party, and terminals B and C are participant parties. The multi-party call control method may include: the terminal A setting up calls with the terminals B and C, respectively; and the terminal A informing the network to discard uplink service data of the terminals B and C.

In the method shown in FIG. 5, the terminal A as the host party realizes unidirectionally speaking to the terminals B and C as the participant parties through the network.

Figure 6:
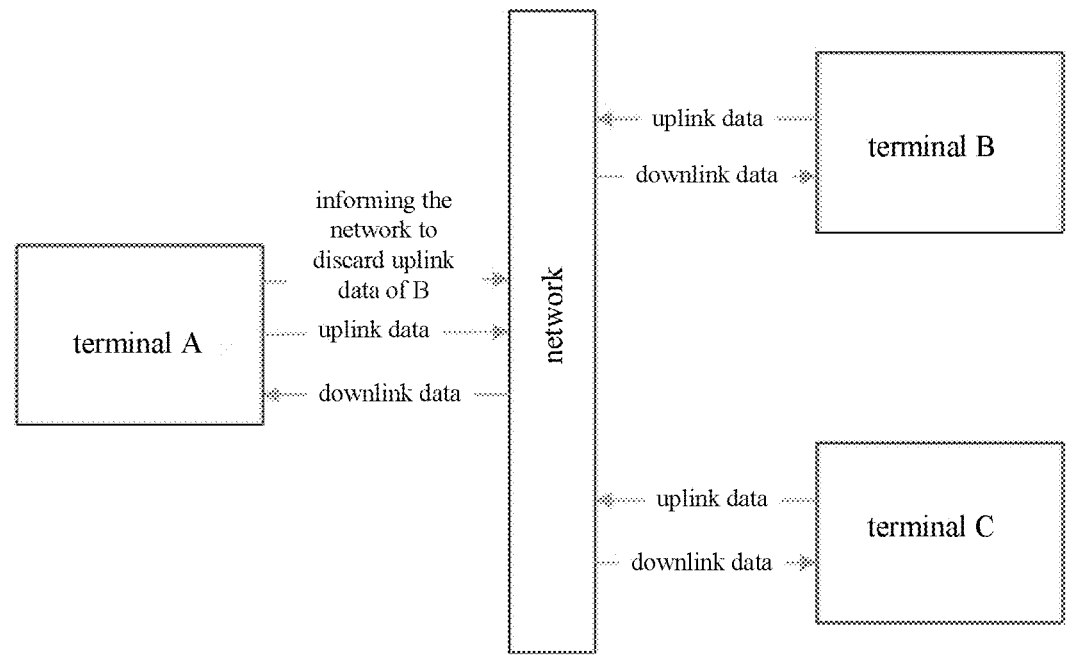
FIG. 6 schematically illustrates a diagram of a multi-party call control method according to an embodiment.

The multi-party call control method is described in detail below with another specific embodiment. Referring to FIG. 6, a terminal A is a host party, and terminals B and C are participant parties. The multi-party call control method may include: the terminal A setting up calls with the terminals B and C, respectively; and the terminal A informing the network to discard uplink service data of the terminal B.

In the method shown in FIG. 6, the network realizes prohibiting speaking of the terminal B in the participant parties.

Figure 7:
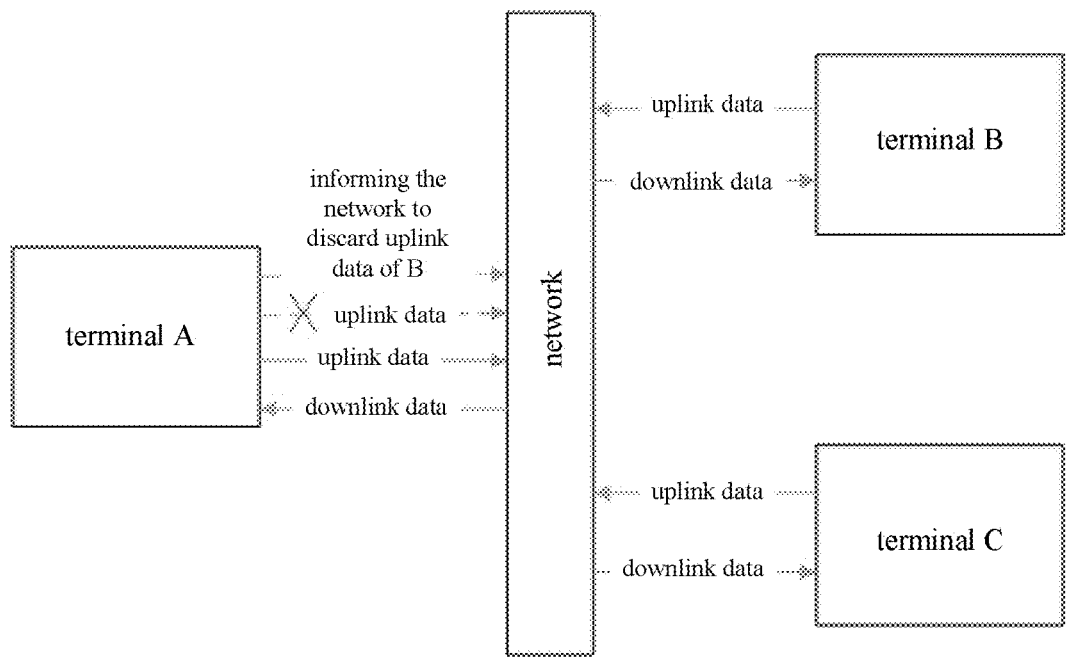
FIG. 7 schematically illustrates a diagram of a multi-party call control method according to an embodiment.

The multi-party call control method is described in detail below with another specific embodiment. Referring to FIG. 7, a terminal A is a host party, and terminals B and C are participant parties. The multi-party call control method may include: the terminal A setting up calls with the terminals B and C, respectively; and the terminal A informing the network to discard uplink service data of the terminal B and cut off uplink service data transmitted by the terminal A to the terminal B.

In the method shown in FIG. 7, the network realizes isolating the terminal B in the participant parties.

In some embodiments, informing at least one of the at least two terminals to control uplink and downlink service data of the at least one terminal may include: informing at least one of the at least two terminals to prohibit transmitting service data of the at least one terminal; or informing at least one of the at least two terminals to prohibit receiving service data; or informing at least one of the at least two terminals to prohibit transmitting service data of the at least one terminal and receiving service data.

Figure 8:
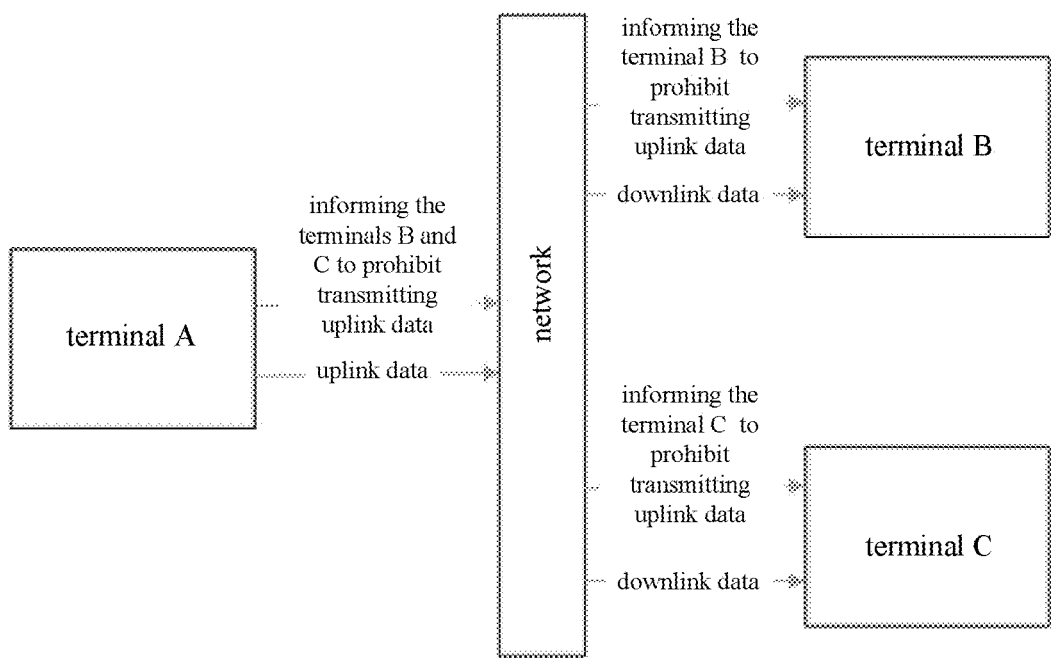
FIG. 8 schematically illustrates a diagram of a multi-party call control method according to an embodiment.

The multi-party call control method is described in detail below with a specific embodiment. Referring to FIG. 8, a terminal A is a host party, and terminals B and C are participant parties. The multi-party call control method may include: the terminal A setting up calls with the terminals B and C, respectively; and the terminal A informing remote terminals, i.e., the terminals B and C, to prohibit transmitting uplink service data.

In the method shown in FIG. 8, the terminal A as the host party realizes unidirectionally speaking to the terminals B and C as the participant parties through the remote terminals.

Figure 9:
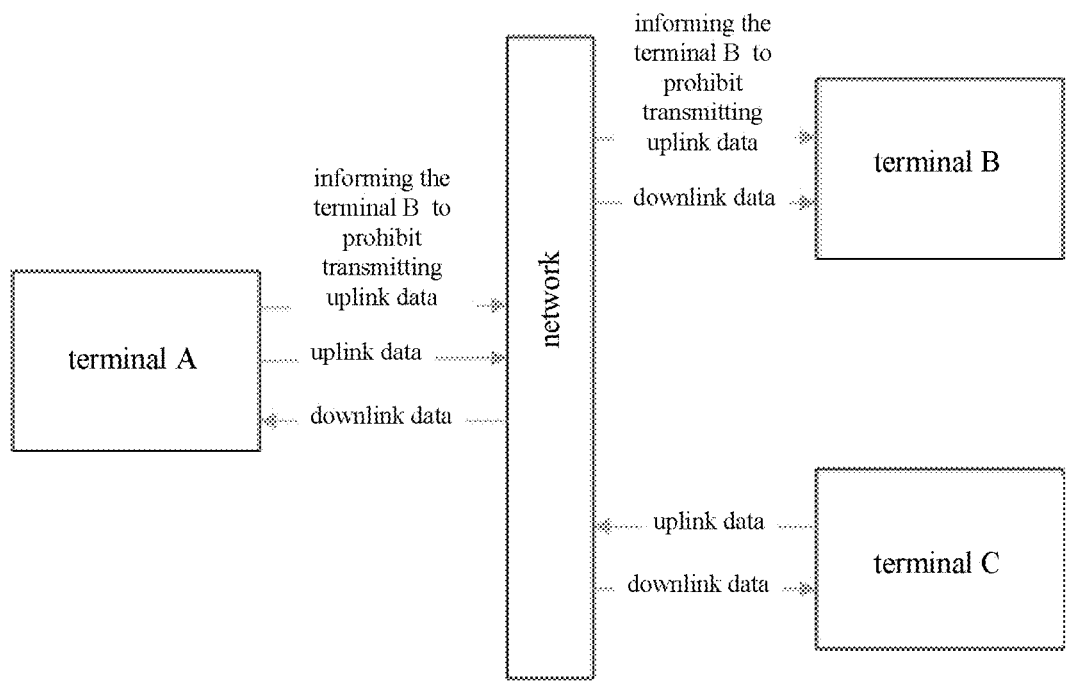
FIG. 9 schematically illustrates a diagram of a multi-party call control method according to an embodiment.

The multi-party call control method is described in detail below with another specific embodiment. Referring to FIG. 9, a terminal A is a host party, and terminals B and C are participant parties. The multi-party call control method may include: the terminal A setting up calls with the terminals B and C, respectively; and the terminal A informing the terminal B to prohibit transmitting uplink service data.

In the method shown in FIG. 9, the remote terminal realizes prohibiting speaking of the terminal B in the participant parties.

Figure 10:
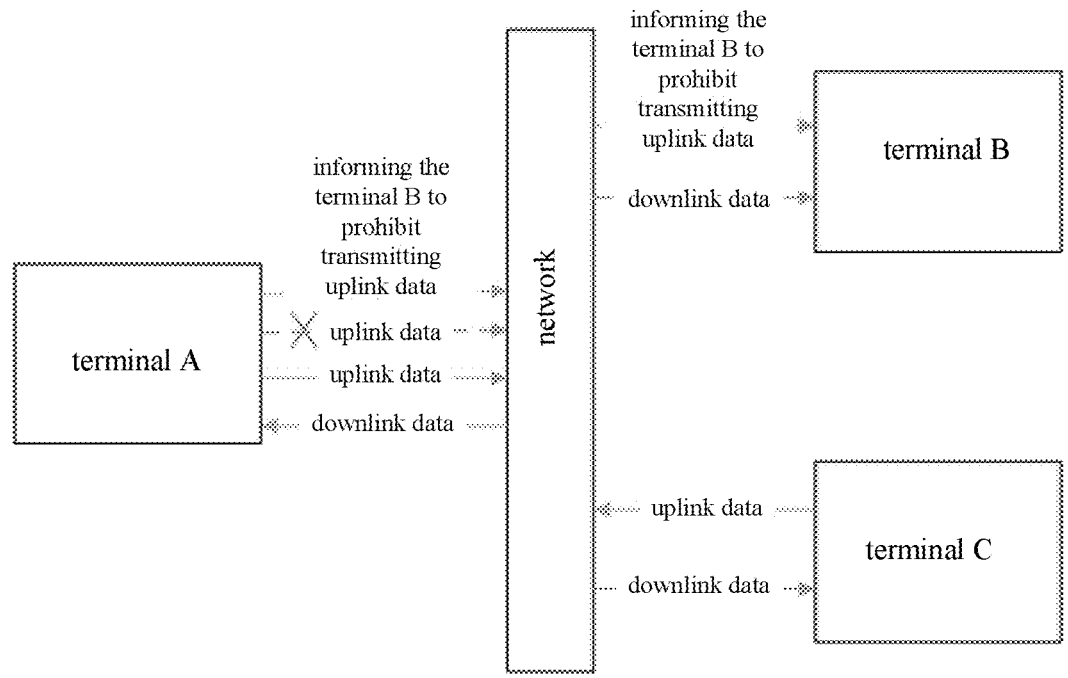
FIG. 10 schematically illustrates a diagram of a multi-party call control method according to an embodiment.

The multi-party call control method is described in detail below with another specific embodiment. Referring to FIG. 10, a terminal A is a host party, and terminals B and C are participant parties. The multi-party call control method may include: the terminal A setting up calls with the terminals B and C, respectively; and the terminal A informing the remote terminal B to prohibit transmitting uplink service data and receiving downlink service data.

In the method shown in FIG. 10, the remote terminal realizes isolating the terminal B in the participant parties.

In some embodiments, setting up calls with at least two terminals, respectively may include: during the set-up of a new call among the calls, a call among the calls which has been set up is in an activated state.

In some embodiments, the calls may be based on a radio network connection.

In some embodiments, the calls may be VoLTE service or VoWiFi service.

The multi-party call control method provided in embodiments of the present disclosure includes: setting up calls with at least two terminals, respectively; and controlling uplink and downlink service data of at least one of the at least two terminals, or informing a network to control uplink and downlink service data of at least one of the at least two terminals, or informing at least one of the at least two terminals to control uplink and downlink service data of the at least one terminal. Compared with the existing techniques, in embodiments of the present disclosure, all the remote terminals in the multi-party call may be flexibly controlled according to different session demands and actions.

Figure 11:
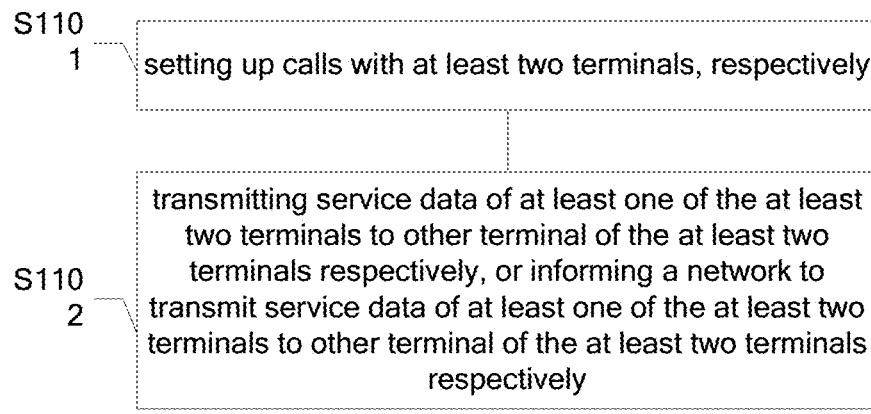
FIG. 11 schematically illustrates a flow chart of a multi-party call control method according to an embodiment.

FIG. 11 schematically illustrates a flow chart of a multi-party call control method according to an embodiment. Referring to FIG. 11, the method includes:

S1101, setting up calls with at least two terminals, respectively; and

S1102, transmitting service data of at least one of the at least two terminals to other terminal of the at least two terminals respectively, or informing a network to transmit service data of at least one of the at least two terminals to other terminal of the at least two terminals respectively.

In some embodiments, transmitting service data of at least one of the at least two terminals to other terminal of the at least two terminals respectively may include: for each of the at least two terminals, processing the service data of the terminal and forwarding the processed service data to other terminal of the at least two terminals; or for each of the at least two terminals, directly forwarding the service data of the terminal to other terminal of the at least two terminals.

Figure 12:
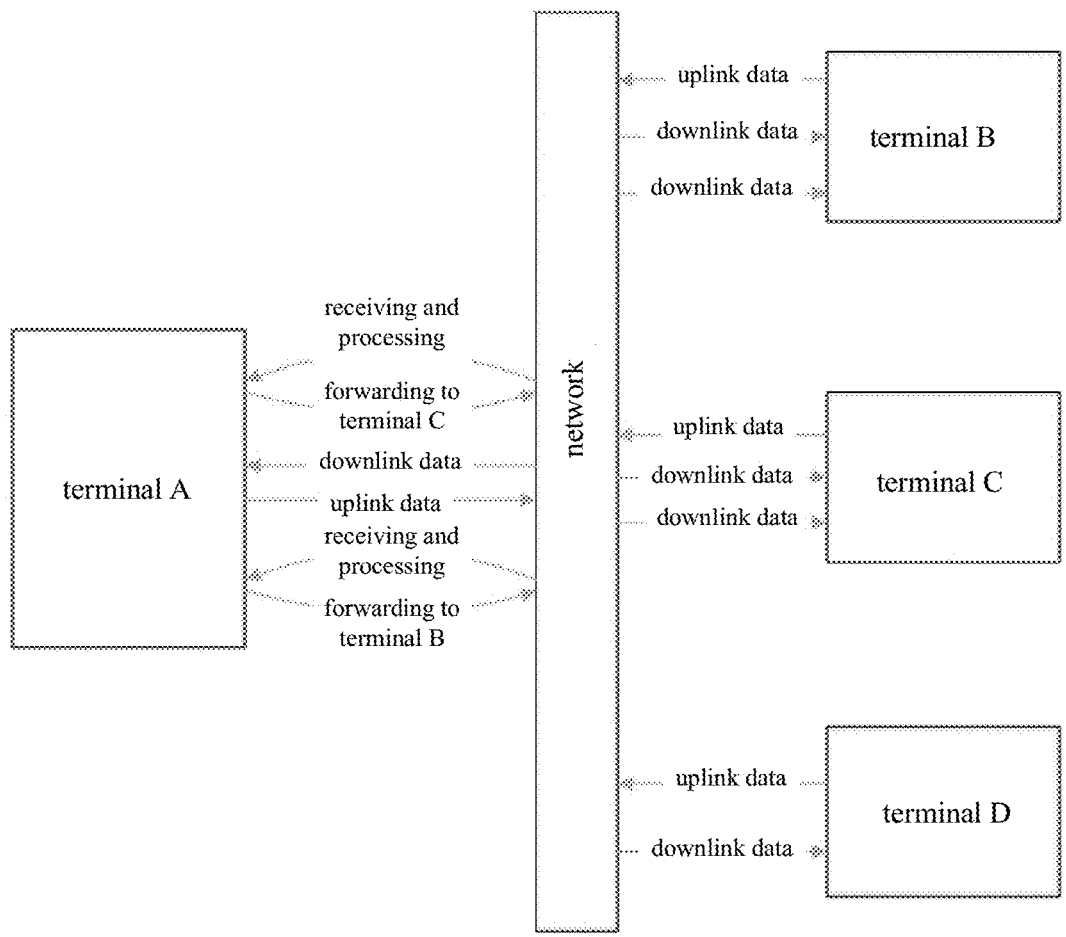
FIG. 12 schematically illustrates a diagram of a multi-party call control method according to an embodiment.

The multi-party call control method is described in detail below with a specific embodiment. Referring to FIG. 12, a terminal A is a host party, and terminals B, C and D are participant parties. The multi-party call control method may include: the terminal A setting up calls with the terminals B, C and D, respectively; the terminal A receiving service data of two terminals in the three participant parties, i.e., the terminals B and C; processing the service data of the terminal B and forwarding the processed service data to the terminal C; and processing the service data of the terminal C and forwarding the processed service data to the terminal B.

In the method shown in FIG. 12, the terminal A as the host party realizes a partial conference with a portion of the participant parties, i.e., the terminals B and C. In a scene where the participant parties include two terminals, the partial conference is related to the host party and one of the two terminals.

Figure 13:
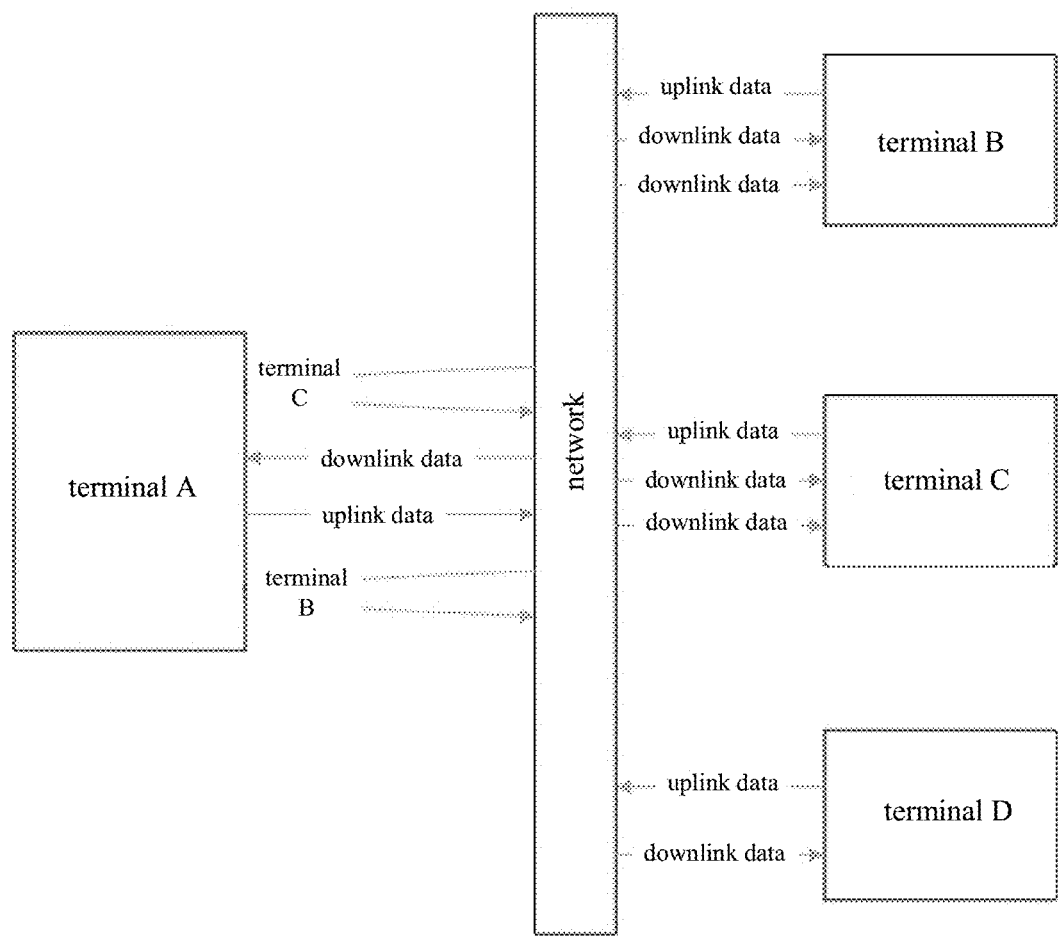
FIG. 13 schematically illustrates a diagram of a multi-party call control method according to an embodiment.

The multi-party call control method is described in detail below with another specific embodiment. Referring to FIG. 13, a terminal A is a host party, and terminals B, C and D are participant parties. The multi-party call control method may include: the terminal A setting up calls with the terminals B, C and D, respectively; the terminal A receiving service data of two terminals in the three participant parties, i.e., the terminals B and C; directly forwarding the service data of the terminal B to the terminal C; and directly forwarding the service data of the terminal C to the terminal B.

In the method shown in FIG. 13, the terminal A as the host party realizes a partial conference between the terminal B and the terminal C. In a scene where the participant parties include two terminals, the partial conference is related to the host party and one of the two terminals.

In some embodiments, informing a network to transmit service data of at least one of the at least two terminals to other terminal of the at least two terminals respectively may include: for each of the at least two terminals, informing the network to process the service data of the terminal and forward the processed service data to other terminal of the at least two terminals; or for each of the at least two terminals, informing the network to directly forward the service data of the terminal to other terminal of the at least two terminals.

Figure 14:
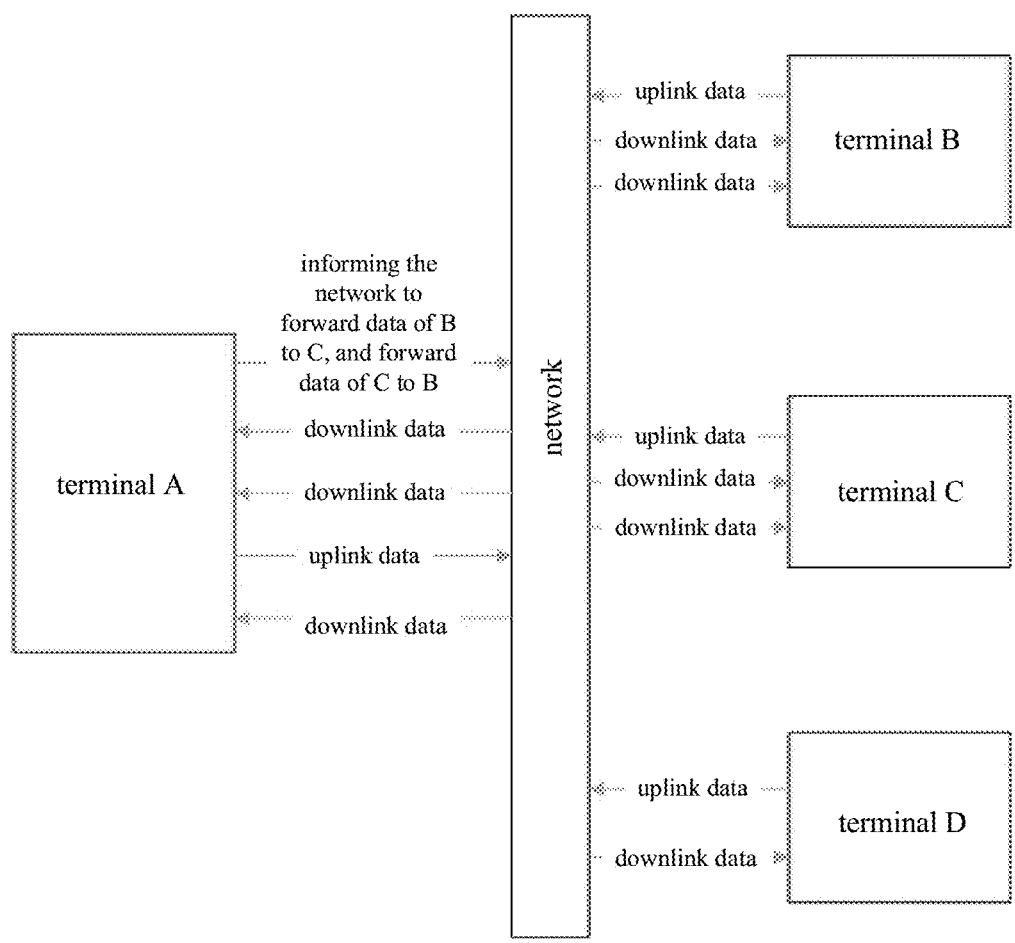
FIG. 14 schematically illustrates a diagram of a multi-party call control method according to an embodiment.

The multi-party call control method is described in detail below with a specific embodiment. Referring to FIG. 14, a terminal A is a host party, and terminals B, C and D are participant parties. The multi-party call control method may include: the terminal A setting up calls with the terminals B, C and D, respectively; the terminal A receiving service data of two terminals in the three participant parties, i.e., the terminals B and C; and informing the network to process the service data of the terminal B and forward the processed service data to the terminal C, and to process the service data of the terminal C and forward the processed service data to the terminal B.

In the method shown in FIG. 14, the terminal A as the host party realizes a partial conference with a portion of the participant parties, i.e., the terminals B and C, by informing the network. In a scene where the participant parties include two terminals, the partial conference is related to the host party and one of the two terminals.

Figure 15:
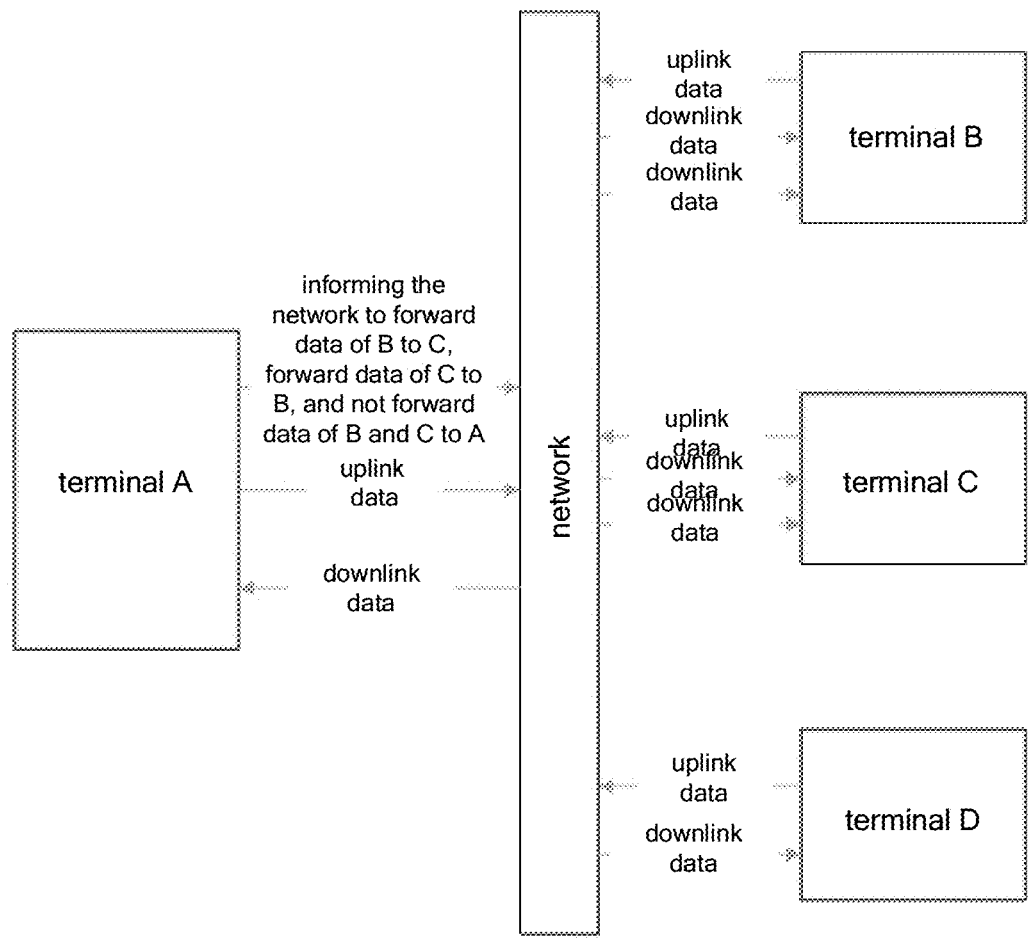
FIG. 15 schematically illustrates a diagram of a multi-party call control method according to an embodiment.

The multi-party call control method is described in detail below with another specific embodiment. Referring to FIG. 15, a terminal A is a host party, and terminals B, C and D are participant parties. The multi-party call control method may include: the terminal A setting up calls with the terminals B, C and D, respectively; and the terminal A informing the network to directly forward the service data of the terminal B to the terminal C and directly forward the service data of the terminal C to the terminal B.

In the method shown in FIG. 15, the terminal A as the host party realizes a partial conference between the terminal B and the terminal C by informing the network. In a scene where the participant parties include two terminals, the partial conference is related to the host party and one of the two terminals.

In some embodiments, setting up calls with at least two terminals, respectively may include: during the set-up of a new call among the calls, a call among the calls which has been set up is in an activated state.

In some embodiments, the calls may be based on a radio network connection.

In some embodiments, the calls may be VoLTE service or VoWiFi service.

The multi-party call control method provided in embodiments of the present disclosure includes: setting up calls with at least two terminals, respectively; and transmitting service data of at least two of the at least two terminals to other terminals of the at least two terminals respectively, or informing a network to transmit service data of at least two of the at least two terminals to other terminals of the at least two terminals respectively. Compared with the existing techniques, in embodiments of the present disclosure, all the remote terminals in the multi-party call may be flexibly controlled according to different session demands and actions.

Figure 16:
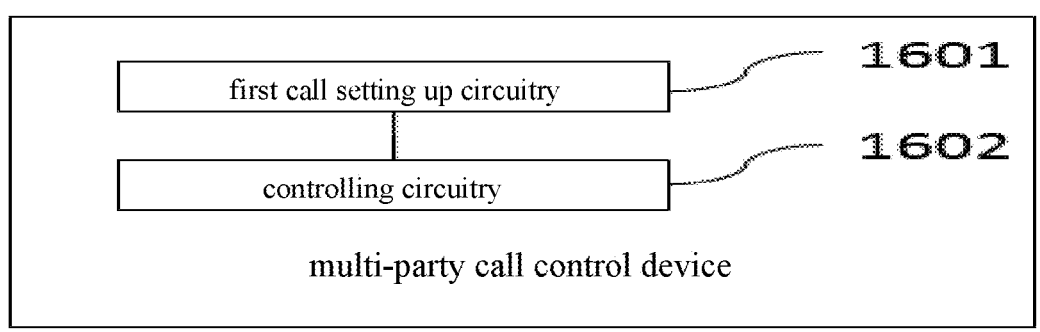
FIG. 16 schematically illustrates a structural diagram of a multi-party call control device according to an embodiment.

FIG. 16 schematically illustrates a structural diagram of a multi-party call control device according to an embodiment. Referring to FIG. 16, the device may include: a first call setting up circuitry 1601 configured to set up calls with at least two terminals, respectively; and a controlling circuitry 1602 configured to control uplink and downlink service data of at least one of the at least two terminals, or inform a network to control uplink and downlink service data of at least one of the at least two terminals, or inform at least one of the at least two terminals to control uplink and downlink service data of the at least one terminal.

The multi-party call control device provided in embodiments of the present disclosure sets up calls with at least two terminals, respectively; and controls uplink and downlink service data of at least one of the at least two terminals, or informs a network to control uplink and downlink service data of at least one of the at least two terminals, or informs at least one of the at least two terminals to control uplink and downlink service data of the at least one terminal. Compared with the existing techniques, in embodiments of the present disclosure, all the remote terminals in the multi-party call may be flexibly controlled according to different session demands and actions.

In some embodiments, the controlling circuitry 1602 may be configured to: discard service data from at least one of the at least two terminals; or cut off service data transmitted to at least one of the at least two terminals; or discard service data from at least one of the at least two terminals and cut off service data transmitted to at least one of the at least two terminals.

In some embodiments, the controlling circuitry 1602 may be configured to: inform the network to discard service data from at least one of the at least two terminals; or inform the network to cut off service data transmitted to at least one of the at least two terminals; or inform the network to discard service data from at least one of the at least two terminals and cut off service data transmitted to at least one of the at least two terminals.

In some embodiments, the controlling circuitry 1602 may be configured to: inform at least one of the at least two terminals to prohibit transmitting service data of the at least one terminal; or inform at least one of the at least two terminals to prohibit receiving service data; or inform at least one of the at least two terminals to prohibit transmitting service data of the at least one terminal and receiving service data.

In some embodiments, the first call setting up circuitry 1601 may be configured to: during the set-up of a new call among the calls, control a call among the calls which has been set up to be in an activated state, and control the at least two terminals not to perform service data interaction.

In some embodiments, the calls may be based on a radio network connection.

In some embodiments, the calls may be VoLTE service or VoWiFi service.

Figure 17:
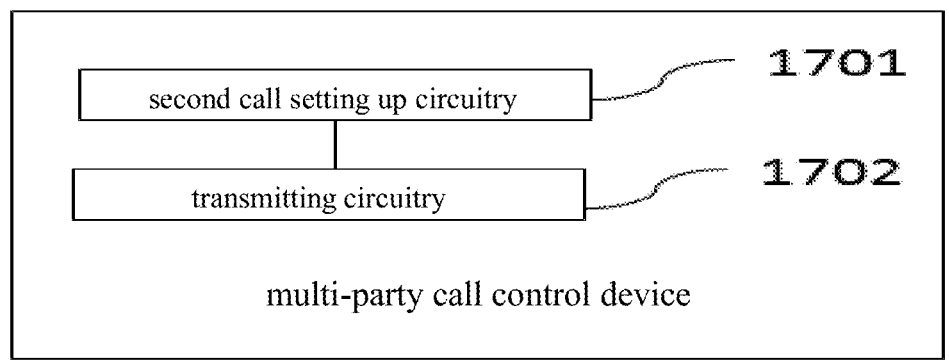
FIG. 17 schematically illustrates a structural diagram of a multi-party call control device according to an embodiment.
Figure 18:
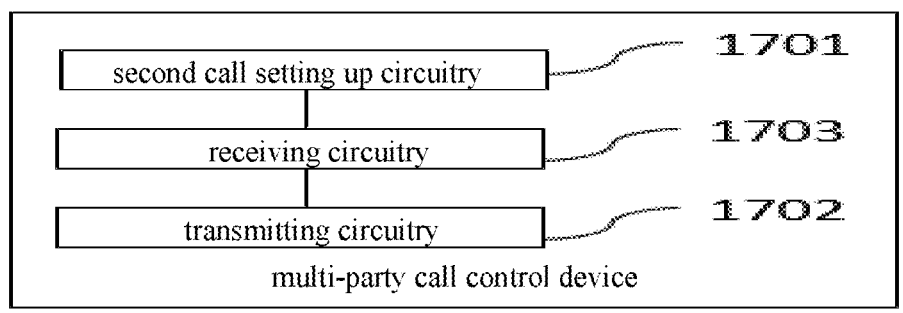
FIG. 18 schematically illustrates a structural diagram of a multi-party call control device according to an embodiment.

FIG. 17 schematically illustrates a structural diagram of a multi-party call control device according to an embodiment. Referring to FIG. 17, the device may include: a second call setting up circuitry 1701 configured to set up calls with at least two terminals, respectively; and a transmitting circuitry 1702 configured to transmit service data of at least one of the at least two terminals to other terminal of the at least two terminals respectively, or inform a network to transmit service data of at least one of the at least two terminals to other terminal of the at least two terminals respectively.

The multi-party call control device provided in embodiments of the present disclosure sets up calls with at least two terminals, respectively; and transmits service data of at least one of the at least two terminals to other terminals of the at least two terminals respectively, or informs a network to transmit service data of at least one of the at least two terminals to other terminals of the at least two terminals respectively. Compared with the existing techniques, in embodiments of the present disclosure, all the remote terminals in the multi-party call may be flexibly controlled according to different session demands and actions.

In some embodiments, the device may further include a receiving circuitry 1703 configured to: before the transmitting circuitry 1702 transmits service data of at least one of the at least two terminals to other terminal of the at least two terminals respectively, or informs the network to transmit service data of at least one of the at least two terminals to other terminal of the at least two terminals respectively, receive a request from at least one of the at least two terminals.

In some embodiments, the transmitting circuitry 1702 may be configured to: for each of the at least two terminals, process the service data of the terminal and forward the processed service data to other terminal of the at least two terminals; or for each of the at least two terminals, directly forward the service data of the terminal to other terminal of the at least two terminals.

In some embodiments, the transmitting circuitry 1702 may be configured to: for each of the at least two terminals, inform the network to process the service data of the terminal and forward the processed service data to other terminal of the at least two terminals; or for each of the at least two terminals, inform the network to directly forward the service data of the terminal to other terminal of the at least two terminals.

In some embodiments, the second call setting up circuitry 1701 may be configured to: during the set-up of a new call among the calls, control a call among the calls which has been set up to be in an activated state, and control the at least two terminals not to perform service data interaction.

In some embodiments, the calls may be based on a radio network connection.

In some embodiments, the calls may be VoLTE service or VoWiFi service.

In an embodiment of the present disclosure, a multi-pass terminal including any one of the above multi-party call control devices is provided.

In some embodiments, the service data may be voice, video, picture or document, which is not limited in the embodiments of the present disclosure.

Those skilled in the art can understand that all of or a portion of the processes in the method provided in the above embodiments can be implemented by related hardware with instruction of computer program. The computer program may be stored in a readable storage medium, such as a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A multi-party call control method, comprising:
   using a first terminal to set up calls with at least two terminals, respectively; and
   with the first terminal, informing at least one of the at least two terminals to prohibit transmitting service data of the at least one terminal, or informing at least one of the at least two terminals to prohibit receiving service data, or informing at least one of the at least two terminals to prohibit transmitting service data of the at least one terminal and receiving service data.

2. The method according to claim 1, wherein setting up calls with at least two terminals, respectively comprises: during the set-up of a new call among the calls, a call among the calls which has been set up is in an activated state.

3. The method according to claim 1, wherein the calls are based on a radio network connection.

4. The method according to claim 1, wherein the calls are VoLTE service or VoWiFi service.

5. A multi-party call control device mounted on a first terminal, comprising:
   a first call setting up circuitry configured to set up calls with at least two terminals, respectively; and
   a controlling circuitry configured to inform at least one of the at least two terminals to prohibit transmitting service data of the at least one terminal, or inform at least one of the at least two terminals to prohibit receiving service data, or inform at least one of the at least two terminals to prohibit transmitting service data of the at least one terminal and receiving service data.

6. The multi-party call control device according to claim 5, wherein the first call setting up circuitry is configured to: during the set-up of a new call among the calls, control a call among the calls which has been set up to be in an activated state, and control the at least two terminals not to perform service data interaction.

7. The multi-party call control device according to claim 5, wherein the calls are based on a radio network connection.

8. The multi-party call control device according to claim 5, wherein the calls are VoLTE service or VoWiFi service.

9. A multi-pass terminal comprising a multi-party call control device mounted on a first terminal, wherein the multi-party call control device comprises:
   a first call setting up circuitry configured to set up calls with at least two terminals, respectively; and
   a controlling circuitry configured to inform at least one of the at least two terminals to prohibit transmitting service data of the at least one terminal, or inform at least one of the at least two terminals to prohibit receiving service data, or inform at least one of the at least two terminals to prohibit transmitting service data of the at least one terminal and receiving service data.

10. The multi-pass terminal according to claim 9, wherein the first call setting up circuitry is configured to: during the set-up of a new call among the calls, control a call among the calls which has been set up to be in an activated state, and control the at least two terminals not to perform service data interaction.

11. The multi-pass terminal according to claim 9, wherein the calls are based on a radio network connection.

* * * * *